United States Patent [19]

Shiki

[11] 4,134,069
[45] Jan. 9, 1979

[54] SINGLE SIDE BAND MULTIPLEX SIGNAL RADIO RELAY

[75] Inventor: Haruo Shiki, Tokyo, Japan

[73] Assignee: Nippon Electric Co., Ltd., Tokyo, Japan

[21] Appl. No.: 795,044

[22] Filed: May 9, 1977

Related U.S. Application Data

[63] Continuation-in-part of Ser. No. 678,528, Apr. 21, 1976, abandoned.

[30] Foreign Application Priority Data

Apr. 23, 1975 [JP] Japan ................................ 50-49431

[51] Int. Cl.² ............................................. H04B 7/14
[52] U.S. Cl. ........................................... 325/11; 325/5
[58] Field of Search ........................................ 325/1, 3–5,
325/7, 9–11, 12, 47, 432, 433; 343/176, 179, 200;
179/15 FE, 15 FS, 15 AN, 170 A, 170.4

[56] References Cited

U.S. PATENT DOCUMENTS

| | | |
|---|---|---|
| 2,344,813 | 3/1944 | Goldstine ............................ 325/11 |
| 2,406,932 | 9/1946 | Tunick ................................ 325/7 |
| 2,407,212 | 9/1946 | Tunick ................................ 325/11 |
| 2,407,213 | 9/1946 | Tunick ................................ 325/11 |
| 2,874,273 | 2/1959 | Jacobsen ............................ 325/11 |

OTHER PUBLICATIONS

"Communication Systems Design", Philip Panter, pp. 1–19, McGraw Hill, 1972.
"Microwave Communication" by Yonezawa et al., Maruzen Co., pp. 374–376, 1963.

*Primary Examiner*—Robert L. Griffin
*Assistant Examiner*—Jin F. Ng
*Attorney, Agent, or Firm*—Sughrue, Rothwell, Mion, Zinn and Macpeak

[57] ABSTRACT

A radio relay for transmitting single side band (SSB) multiplex signals is disclosed. The receiving (or transmitting) frequencies on the up link and the down link at a repeater station are made different from each other for the purpose of reducing interference crosstalk between the transmission signals. More particularly, a shift frequency corresponding to the difference between the receiving frequency and the transmitting frequency on the up link or the down link at a repeater station A is selected in sequence from any one of the reference shift frequency fc and a plurality of shift frequencies deviated from the reference shift frequency according to the relation $fc + n_i \times \Delta f$, where $n_i$ is a positive or negative integer and $\Delta f$ is a radix deviation frequency.

7 Claims, 7 Drawing Figures

FIG.1
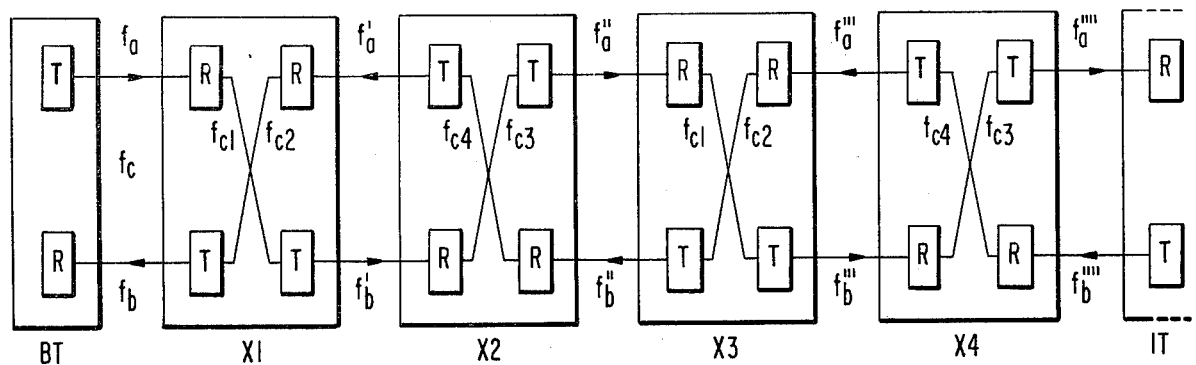
FIG.2a
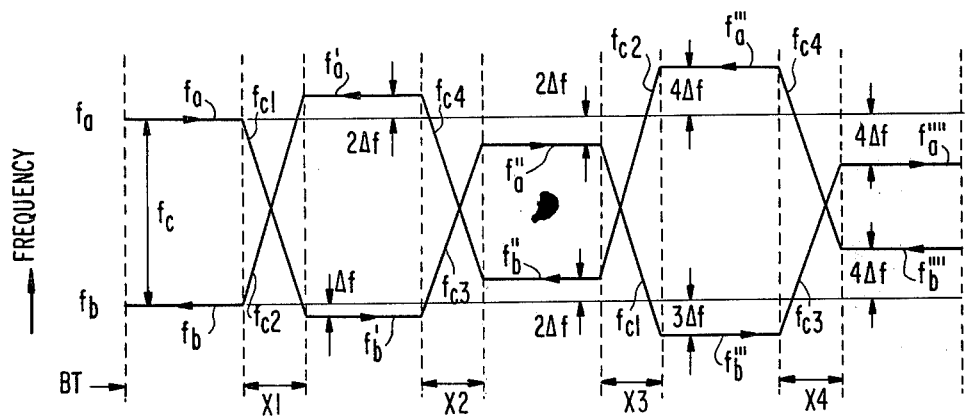
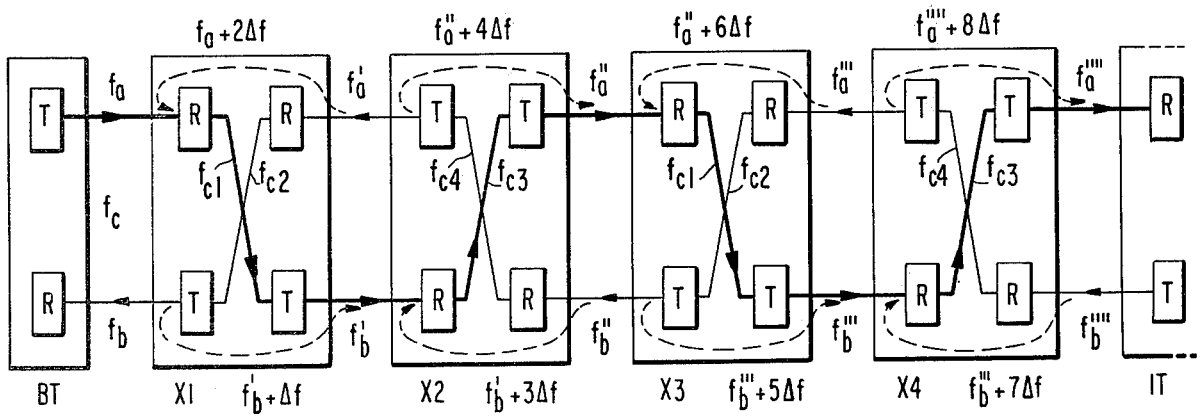
FIG.2b

SINGLE SIDE BAND MULTIPLEX SIGNAL RADIO RELAY

CROSS REFERENCE TO RELATED APPLICATION

This is a Continuation-In-Part application of my copending application Ser. No. 678,528 filed Apr. 21, 1976, now abandoned.

BACKGROUND OF THE INVENTION

The present invention relates to a radio relay for transmitting single side band (SSB) multiplex signals, and particularly to such radio relay for reducing interference crosstalk between the transmission signals.

An SSB super-multiplex telephone signal transmission is known to occupy the smallest necessary frequency bandwidth in principle. However, the super-multiplex signal transmission has been developed solely relying on FM, mainly because a superwide band amplifier having excellent linearity has been very difficult to provide in the microwave band. However, since the experimental results were published that the principle of the feed-forward amplifier invented by Harold S. Black is applicable to the microwave region (H. Seidel: "A Microwave Feed-Forward Experiment" BSTJ, Vol. 50, No. 9, pp. 2879–2916, 1971), practical research investigations for a microwave SSB super-multiplex communication system have been rapidly progressing.

If the transmission of signals having the same degree of multiplexing is intended, taking advantage of the SSB communication system over the FM communication system, the following points should be taken into consideration:

(A-1) The occupied bandwidth is halved, and
(A-2) An echo distortion noise inherent to an FM communication system is not caused.

On the other hand, however, the SSB communication system involves the following problems:

(B-1) It is necessary to suppress to the order of a several Hz the carrier frequency variation of SSB multiplex signals caused by the relaying, and
(B-2) It is necessary to reduce the interference crosstalk between transmission signals from the first terminal station to the second terminal station (hereinafter referred to as "down link") and those in the opposite direction (hereinafter referred to as "up link") that is determined by the front-to-back coupling ratio of antennas.

The SSB communication system in the microwave frequency band, is well known in a coaxial cable transmission system, required an extremely excellent frequency stability for satisfying the condition (B-1). Accordingly, as a repeater for an intermediate repeater station, it is desirable to use a repeater employing a local oscillator of shift frequency converter type which can precisely maintain the difference between the receiving frequency and the transmitting frequency in a relatively easy manner. On the other hand, as transmitting and receiving repeaters for a terminal station, a local oscillator having a frequency stability of the order of $10^{-9}$ is necessitated. However, a practical oscillator satisfying this condition is difficult to obtain. As a solution to this problem, a method is used for controlling the oscillation frequency of the receiving local oscillator in the receiver of a terminal station so that a continuous pilot signal (for instance, 8,500 KHz) contained in the SSB multiplex signal may become just a predetermined frequency at the demodulation output of the receiver.

By employing the aforementioned method, it is possible to limit to a region of several Hz the frequency deviation caused by the relaying.

Further, in a first and a second antennas in common use for reception and transmission at a repeater station (as shown in FIG. 1–6 and described on pp. 1–19 of Philip F. Panter: *Communication Systems Design*, McGraw-Hill, 1972) of an up link and a down link, since the receiving signals at the first and second antennas ($S_1$ and $S_2$ of 5945.2 MHz, for example, in a 6 GHz-band corresponding to $f_1$, $f_3$ or $f_5$ shown in FIG. 1–6 of the text by Panter) and the transmitting signals at the first and second antennas (for example, $S_1'$ and $S_2'$ of 6197.2 MHz corresponding to $f_7$, $f_9$ or $f_{11}$ shown in FIG. 1–6 of the text by Panter) have their carrier center frequencies selected substantially equal to each other, there exists an interference that is determined by a front-to-back ratio of the first and second antennas. In general, the magnitude of the front-to-back ratio is determined by the type and the aperture area of the antenna and the relative angle between antennas, and it is of the order of 60 dB $\sim$ 70 dB. Normally, the magnitudes of $S_1$ and $S_2$ (or $S_1'$ and $S_2'$) are substantially at the same level, but since they are frequency-modulated under a noise-loaded condition, it has been known that a signal-to-noise ratio is improved by 16 dB with respect to a signal-to-interference ratio owing to the so-called dispersal effect. The detailed description is given in Yonezawa et al: *Microwave Communication*, Maruzen Co., 1963 at pp. 374–376.

Accordingly, in an FM communication system, the degradation of the signal-to-noise ratio that is determined by the front-to-back ratio of antennas amounts to 76 dB $\sim$ 86 dB in one combination; this being equivalent to 14 pico-watts to 1.4 pico-watts when converted into psophometric noise power, and so it is seen that this value is a sufficiently small value in comparison to a limit value for a permissible psophometric noise power of 100 pico-watts per one repeater.

However, in an SSB communication system, since the dispersal effect resulting from frequency modulation in the FM communication system does not exist, there still remains a problem that the signal-to-interference ratio becomes equal to the signal-to-noise ratio, and so this solely exceeds the limit value for a permissible psophometric noise power per one repeater.

As one solution to this problem, it has been proposed to utilize the aforementioned dispersal effect as described on page 374 of the text by Yonezawa et al. More particularly, it is a method in which a triangular dispersal signal is applied to a local oscillator in a terminal station transmitter and thereby frequency modulation of the order of peak-to-peak 100 KHz is applied. However, in this case the following disadvantages are involved:

(C-1) In a terminal station receiver, it is necessary to suppress this dispersal modulation signal to about 2 Hz peak-to-peak, and so a negative feed-back circuit having an extremely high compression factor is required.
(C-2) In a microwave communication system, when a large number of repeater stations are cascaded, an IF switching station is needed to increase reliability of the system. In this case, since the frequencies and phases of the dispersal signals of the operating channel and the stand-by channel are generally not the same, there is a disadvantage that a frequency deviation of the SSB multiplex signals is caused upon switching at the IF switching station and thus the frequency of the SSB multiplex signals would vary largely until an AFC completes its follow-up control.

SUMMARY OF THE INVENTION

It is one object of the present invention to provide a radio relay that is free from the aforementioned disadvantages caused by an SSB multiplex signal radio relay system employing a dispersal method.

According to one feature of the present invention, there is provided a single side band multiplex signal radio relay characterized in that a shift frequency corresponding to the difference between the receiving frequency and the transmitting frequency on the up link or the down link at a repeater station and is selected in sequence from any one of the reference shift frequency fc and a plurality of shift frequencies deviated from the reference shift frequency according to the relation $fc + n_i \times \Delta f$ where $n_i$ is a positive or negative integer and $\Delta f$ is a radix deviation frequency, whereby the receiving (or transmitting) frequencies on the up link and the down link at the repeater station are made different from each other.

BRIEF DESCRIPTION OF THE DRAWINGS

Now the invention will be described in more detail with reference to the accompanying drawings, in which:

FIG. 1 shows in block diagram form one method for allocating microwave signal frequencies according to the present invention, FIGS. 2a, 2b, 3a and 3b are diagrams showing examples of the frequency shifts according to the present invention;

DESCRIPTION OF THE PREFERRED EMBODIMENT

Figure 3A:
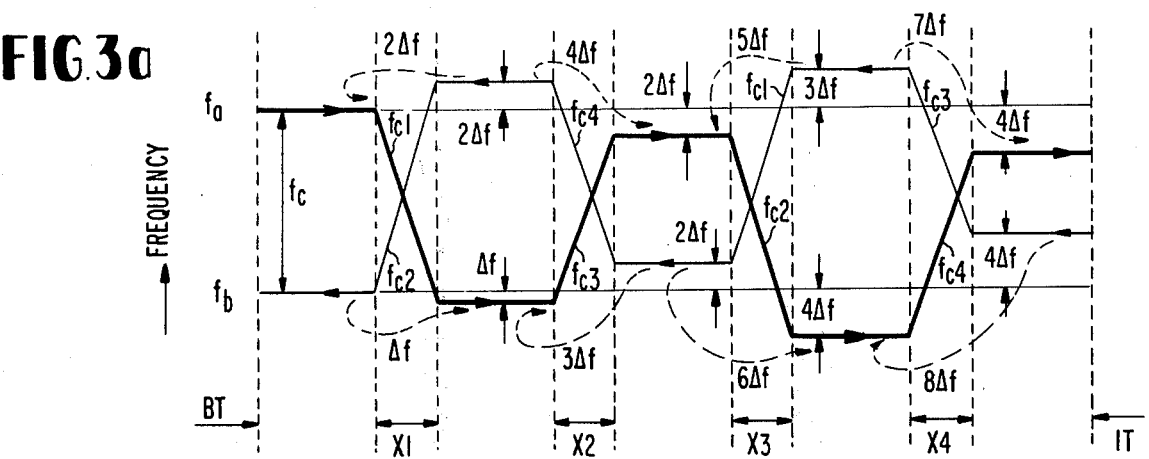
Figure 3B:
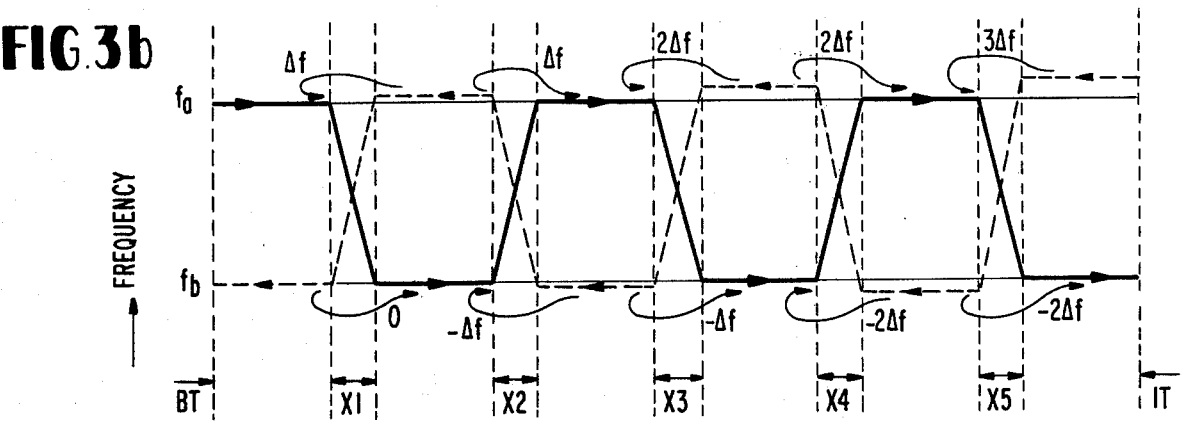

Referring now to FIG. 1 of the drawings, a method for allocating microwave signal frequencies (the frequency being assumed to be a center frequency of SSB super-multiplex signals because a carrier wave does not exist) in the SSB super-multiplex communication system according to the present invention, is shown.

In this figure, reference characters BT designate a baseband terminal station; $X_1$, $X_2$, $X_3$ and $X_4$, intermediate repeater stations (each comprising, for example, the repeater shown in FIG. 1–6 of the text by Panter); and characters IT, an IF switching station. In addition, reference characters $f_a$ and $f_b$ designate a transmitting signal frequency and a receiving signal frequency of a given radio channel transmitter-receiver located at a terminal station. At every repeater station, the shift frequency is intentionally deviated by a predetermined amount from the transmission-reception difference frequency $fc = |fa - fb|$ at the terminal station, and the magnitude of the deviation alternately takes the values $\Delta f$ and $-\Delta f$ ($\Delta f$ is a radix deviation frequency) on the down link, while it alternately takes the values $2\Delta f$ and zero on the up link. More particularly, shift frequency $fc_1 = fc + \Delta f$, $fc_2 = fc + 2\Delta f$, $fc_3 = fc - \Delta f$ and $fc_4 = fc$ are taken to convert a receiving frequency to a transmitting frequency at each repeater station on the up link or the down link, and the magnitude of $\Delta f$ is selected at about 4 KHz (the bandwidth of each speech channel) at the minimum.

Then, the deviation of the interference frequency caused by the front-to-back ratio of the antenna at the station $X_1$ is $fa' - fa = 2\Delta f$ on the receiving side (fa and fa' are the frequencies of the receiving signals $S_1$ and $S_2$, respectively) while it is $fb - fb' = \Delta f$ on the transmitter side (fb and fb' are the frequencies of the transmitting signals $S_1'$ and $S_2'$, respectively), at the station $X_2$ it is $fa' - fa'' = 4\Delta f$ on the transmitter side while it is $fb'' - fb' = 3\Delta f$ on the receiver side, and at the station $X_3$ it is $fa''' - fa'' = 6\Delta f$ on the receiver side while it is $fb'' - fb''' = 5\Delta f$ on the transmitter side. In this way, each time the signal is relayed, the center frequency of the interference wave is deviated successively. This mode of frequency deviation is shown in FIG. 2a. That is, in the SSB multiplex multi-channel speech signal transmission, the shift frequency $\Delta f$ is selected at 4KHz because the SSB signals are arranged side by side at intervals of 4KHz. In other words, the SSB signals are shifted by at least 4KHz for every repeater station so that an SSB speech channel is always interfered by other SSB speech channels. Accordingly, the interference signals from other SSB speech channels approach unintelligible noise each time they are relayed. Also, $\Delta f$ is set at a constant value such as 4KHz, 8KHz, etc. to readily control the shift frequency at the repeater stations.

Accordingly, if attention is paid only to the signal on the down link, at the station $X_1$ reception interference of deviation $2\Delta f$ and transmission interference of deviation $\Delta f$, at the station $X_2$ transmission interference of deviation $4\Delta f$ and reception interference of deviation $3\Delta f$, at the station $X_3$ reception interference of deviation $6\Delta f$ and transmission interference of deviation $5\Delta f$, ..., etc., would arise successively as shown in FIG. 2b. Therefore, if it is assumed that $\Delta f$ is selected exactly equal to 4KHz, then with the signal in the N-th speech channel for the SSB multiplex telephone signals on the down link would cause interference with the signals in the N-th, (N+1)-th, (N+2)-th, (N+3)-th, (N+4)-th, ... speech channels on the up link successively, and since these interference signals have no correlation to each other, eventually the interference signals into the N-th speech channel on the down link would approach unintelligible noise. Accordingly, it can be expected that the signal-to-noise ratio would be improved by 10 dB to 16 dB with respect to the signal-to-interference ratio. According to this method, the above-mentioned disadvantages (C-1) and (C-2) can be eliminated. The adoption of such frequency $\Delta f$ is useful when viewed from the fact that not only the uniformly dispersal effect but also the rule making of the frequency deviation is achieved.

While description has been made above in connection to interferences occurring between one baseband terminal station and an adjacent IF switching station, it is difficult to satisfy the above-mentioned relations continuously over any desired number of relays. More particularly, since the frequency deviation amounts to about 4 KHz per hop in the case of the illustrated embodiment, if it is desired to suppress the deviation from the nominal frequency to within 50 KHz at the maximum, 24 hops are the limit number, and even if the frequency is deviated in the positive and negative directions, respectively, in order to prevent the interference of the same signal pattern in a particular speech channel, 50 hops are the limit number.

This problem can be solved by transferring a radio channel frequency employed in a certain baseband section to another radio channel in the next baseband section.

In the embodiment shown in FIG. 2a, on the down link shift frequencies fc + Δf and fc − Δf are alternately and repeatedly employed, while on the up link shift frequencies fc + 2Δf and fc are alternatively and repeatedly employed. However, obviously the shift frequencies could be repeatedly varied in the order of fc + Δf → fc − Δf → fc + 2Δf → fc ... on the down link while in the order of fc + 2Δf → fc → fc + Δf → fc − Δf → ... on the up link as shown in FIG. 3a.

The above-mentioned is an example in which 4 kinds of shift frequencies are employed. In the embodiment shown in FIG. 3b, one shift frequency fc is employed on the down link, while on the up link, shift frequencies fc + Δf, fc + 2Δf, fc + 3Δf and so on are successively employed. As is apparent from this figure, the same interference pattern appears once for every two hops. However, since the probability of the simultaneous occurrence of fading in the mutually separate hops is so small that the same interference pattern will not cause a significant problem.

In general, by combining a plurality of shift frequencies fc + $n_i$ × Δf ($n_i$ being a positive or negative integer), a similar relay system can be realized.

Furthermore, in case that the present invention and the dispersal method are employed in combination, likewise the abovereferred disadvantages (C-1) and (C-2) can be mitigated because the dispersal modulation factor can be made sufficiently small.

Figure 4:
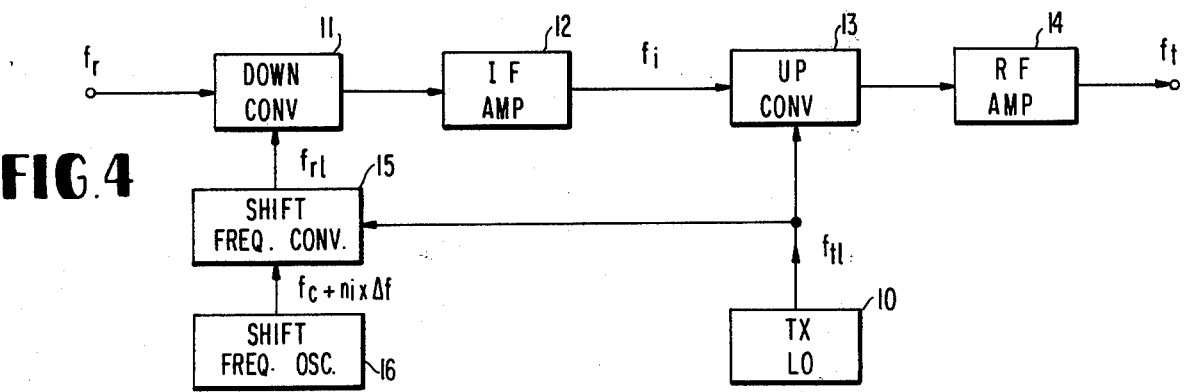
FIG. 4 is a schematic block diagram of a shift frequency converting circuit for use in the repeater station shown in FIG. 1.

Referring to FIG. 4 showing a detailed schematic diagram of a shift frequency converting circuit for use in the repeater station ($X_1 \sim X_4$) shown in FIG. 1, reference numeral 10 designates a transmitting local oscillator; 11, a down frequency converter; 12, an IF amplifier; 13, an up frequency converter; 14, a RF amplifier; 15, a shift frequency converter; 16, a shift frequency oscillator. These are well-known circuit as shown in FIG. 1-5 (a) of the text by Panter. Each repeater station includes the respective shift frequency converting circuits corresponding to the receiver and the transmitter on the up line, and those on the down link shown in FIG. 1. The shift frequency converter 15 mixes the frequency $f_{tl}$ of the local oscillator 10 with the frequency fc + $n_i$ × Δf of the shift frequency oscillator 16 to obtain the frequency $f_{rl}$. In a similar manner, the down frequency converter 11 mixes the receiving frequency $f_r$ (for example, fa, fa′, --- fb′, fb″, fa″, fa‴, fb‴, fb″″ shown in FIG. 1) with the frequency $f_{rl}$ to obtain the intermediate frequency fi. The up frequency converter 13 mixes the intermediate frequency fi with the frequency $f_{tl}$, to obtain the transmitting frequency $f_t$ (for example, fb, fb′, fa′, fa″, fb″, fb‴, fa‴, fa″″ shown in FIG. 1). As a result, the frequency difference $|f_r − f_t|$ between the receiving signal and the transmitting signal becomes exactly equal to fc + $n_i$ × Δf as obvious from FIG. 1-5 (a) of the text by Panter. In general, since fc + $n_i$ × Δf is several hundred MHz and is controlled by a crystal oscialltor, the deviation of the shift frequency can be maintained within one hundred Hz. The deviation of transmitting frequency $f_t$ will increase with relaying the repeater stations. However, the deviations will not exceed 1 KHz so that the deviated frequency falls within the bandwidth of one speech channel.

Figure 5:
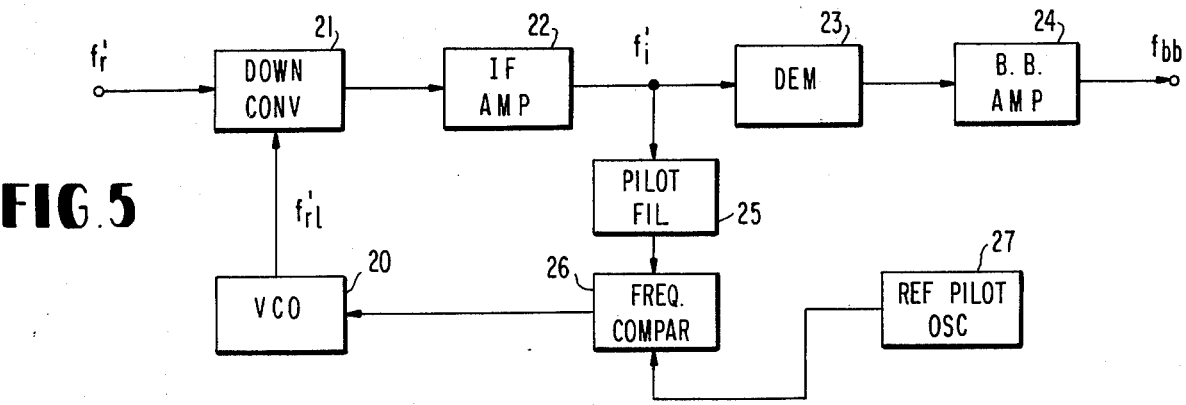
FIG. 5 is a schematic block diagram of the receiver for the terminal station shown in FIG. 1.

In FIG. 5 showing detailed schematic diagram of the receiver terminal station shown in FIG. 1, reference numeral 20 designates a voltage controlled oscillator; 21, a down frequency converter; 22, an IF amplifier; 23, a demodulator; 24, a baseband amplifier; 25, a pilot filter; 26, a frequency comparator; 27, a reference pilot oscillator. These are also well-known circuits as shown in FIG. 2 of D. Leypold et al: "Development Problems of Radio Relay Systems using Single-Sideband Modulation" NTZ-CJ, No. 2, 1965, pp. 68–74. The receiver terminal station receives an SSB multiplex signal on which a pilot signal is superimposed at an SSB multiplexer. The SSB multiplex signal is fed to the down frequency converter input. The down frequency converter mixes the receiving frequency fr′ with the frequency frl′ of the voltage controlled oscillator 20 to provide the intermediate frequency fi′. In the demodulator 23, the baseband signals are demodulated from the IF signals through the IF amplifier 22. The voltage controlled oscillator is controlled by the output of the frequency comparator 26 which compares the frequency of the reference pilot oscillator 27 to the pilot signal frequency extracted by the pilot filter 25. The transmitter terminal station shown in FIG. 1 is, for example, disclosed in FIG. 2 of the article by Leypold et al.

As fully described above, the advantages of the system according to the present invention in the case of SSB multiplex telephone transmission are itemized as follows:

(1) A highly excellent dispersal modulation signal suppressor as seen in the dispersal method is not necessitated, and a sufficient improvement effect in a signal-to-noise ratio can be obtained by employing only 4 kinds of shift frequencies fc − Δf, fc, fc + Δf and fc + 2Δf independently of the radio channels at any repeater station;

(2) Since the deviation of the reception intermediate frequency (for instance, 70 MHz) at the IF switching station and the terminal station is substantially the same independent of the radio channels, the carrier frequency change occurring upon switching over the circuits from any operating channel to a common stand-by channel can be made sufficiently small (about 1 KHz or less). As a result, not only the problem of transient phenomena in frequency that is expected in the case of the dispersal method can be sufficiently mitigated, but also a satisfactory frequency stability can be assumed even with a simple AFC circuit.

What is claimed is:

1. In a single sideband multiplex signal radio relay system including a baseband terminal station and a plurality of intermediate repeater stations arranged in an up link or down link, said terminal station and each of said repeater stations having a transmitter and a receiver, and said terminal station being assigned a reference shift frequency fc corresponding to the difference between a transmitting and receiving frequencies the method of reducing interference crosstalk between transmission signals comprising the first step of providing a plurality of first shift frequencies, each first shift frequency corresponding to the difference between the receiving frequency and the transmitting frequency on the up link or the down link at a repeater station, and the second step of selecting in sequence from one intermediate repeater station to another, each of the first shift frequencies from the reference shift frequency fc and any one of a plurality of second shift frequencies deviated from the reference shift frequency according to the relation fc + $n_i$ × Δf, wherein $n_i$ is a positive or negative integer and $\Delta f$ is a radix deviation frequency, whereby the receiving or transmitting frequencies on an up link and a down link at each said repeater station, and the transmitting frequencies and receiving frequencies on the up link and the down link at said repeater stations are made different from each other.

2. The method according to claim 1, wherein said sequence of second shift frequencies is selected from four kinds of shift frequencies.

3. The method according to claim 2, wherein said sequence of second shift frequencies is selected from the group consisting of $fc - \Delta f$, $fc$, $fc + \Delta f$ and $fc + 2\Delta f$.

4. The method according to claim 3, wherein the second shift frequencies $fc + \Delta f$ and $fc - \Delta f$ are alternately and repeatedly employed at the repeater stations in the down link or the up link and the shift frequencies $fc + 2\Delta f$ and $fc$ are alternately and repeatedly employed at the repeater stations in the up link or the down link.

5. The method according to claim 3, wherein the second shift frequencies are employed in the repeating sequence $fc + \Delta f \rightarrow fc - \Delta f \rightarrow fc + 2\Delta f \rightarrow fc \ldots$ at the repeater stations in the down link or the up link and the shift frequencies are employed in the repeating sequence $fc + 2\Delta f \rightarrow fc \rightarrow fc + \Delta f \rightarrow fc - \Delta f \ldots$ at the repeater stations in the up link or the down link.

6. The method according to claim 1, wherein said radio relay system further includes at least one IF switching station, said method further comprising the step of transferring at said IF switching station a radio channel frequency in a certain baseband section to another radio channel in the next baseband section.

7. In a single sideband multiplex signal radio relay system including a baseband terminal station and a plurality of intermediate repeater stations arranged in an up link or a down link, said terminal station and each of said repeater stations having a transmitter and a receiver, and said terminal station being assigned a reference shift frequency fc corresponding to the difference between a transmitting and receiving frequencies, the improvement for reducing interference crosstalk between transmission signals comprising in each of said plurality of intermediate repeater stations:

a transmitting local oscillator for generating a local oscillator signal, a shift frequency oscillator for generating a first shift frequency signal, a shift frequency converter connected to receive said local oscillator signal and said shift frequency signal for producing a shifted local oscillator signal, a down converter connected to receive said shifted local oscillator signal and the received signal from the input of said receiver for producing a signal having an intermediate frequency signal, and an up converter connected to receiver said intermediate frequency signal and said local oscillator signal for producing a transmitting signal to said transmitter wherein said first shift frequency is selected from said reference shift frequency fc and any one of a plurality of second shift frequencies deviated from the reference shift frequency according to the relation $fc + n_i \times \Delta f$, where $n_i$ is a positive or negative integer and $\Delta f$ is a radix deviation frequency, said first shift frequency being selected in sequence from one intermediate repeater station to another so that the receiving or transmitting frequencies on an up link and a down link at each said repeater station, and the transmitting frequencies and the receiving frequencies on the up link and the down link at said repeater stations are made different from each other.

* * * * *

UNITED STATES PATENT AND TRADEMARK OFFICE
CERTIFICATE OF CORRECTION

PATENT NO. : 4,134,069
DATED : January 9, 1979
INVENTOR(S) : Haruo SHIKI

It is certified that error appears in the above-identified patent and that said Letters Patent are hereby corrected as shown below:

IN THE ABSTRACT:

Line 9 - after "station" delete "A"

Column 1, line 52 - after "band," delete "is"

Column 5, line 40 - delete "circuit" insert -- circuits -- line 50 - after "fa'," delete " --- "

line 51 - after "fb'''' " insert -- --- --

Column 8, line 19 - delete "receiver" insert -- receive --

Signed and Sealed this

Tenth Day of April 1979

[SEAL]

Attest:

RUTH C. MASON
Attesting Officer

DONALD W. BANNER
Commissioner of Patents and Trademarks